Figure 1:
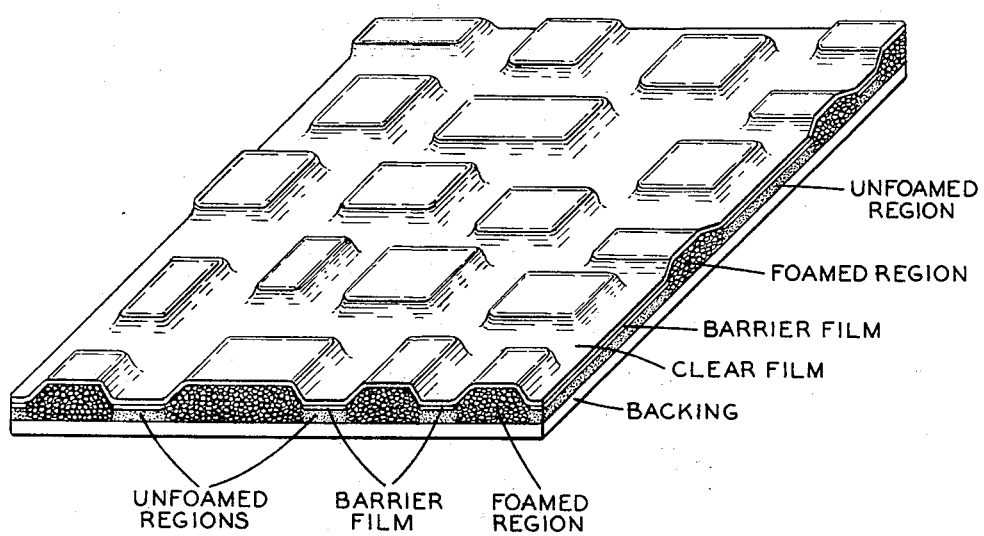

United States Patent
Witman

[11] 3,772,138
[45] Nov. 13, 1973

[54] CHEMICALLY EMBOSSED SURFACE COVERINGS USING BARRIER FILM

[75] Inventor: Jack H. Witman, Lancaster, Pa.

[73] Assignee: Armstrong Cork Company, Lancaster, Pa.

[22] Filed: Aug. 16, 1966

[21] Appl. No.: 572,710

[52] U.S. Cl.................. 161/161, 161/119, 117/11, 156/79, 264/47, 264/52, 264/54
[51] Int. Cl.............................................. E06b 3/92
[58] Field of Search............................... 156/78, 79; 161/159–160, 161, 119; 117/11

[56] References Cited
UNITED STATES PATENTS
3,293,094   12/1966   Nairn et al............................ 156/79

Primary Examiner—David Klein
Attorney—Theodore L. Thomas

[57] ABSTRACT

An embossed thermoplastic sheet. There is blended a vinyl resin, a plasticizer for the resin, and a blowing agent decomposing at an appropriate temperature range. No blowing agent activator is added. The blend is formed into a sheet, preferably by laying down a film of the plastisol on a backing followed by sufficient heat to gel the plastisol without decomposing any of the blowing agent. A barrier film in a predetermined design is applied to the gelled sheet in the pattern which will reproduce the depressed areas in the final product. The barrier film is impenetrable to a blowing agent activator. There is then applied over the entire surface of the sheet a liquid containing a blowing agent activator in order that the activator will penetrate into the sheet only in those areas left exposed by the barrier film; no penetration is achieved in the areas where the barrier film is present. A wear layer may or may not be applied over the resulting system. Subsequent application of heat is such to decompose the blowing agent only in those areas contacted by the activator, leaving the blowing agent in the regions under the barrier film undecomposed.

17 Claims, 2 Drawing Figures

INVENTOR
JACK H. WITMAN

BY *Theodore L. Thomas*

ATTORNEY

CHEMICALLY EMBOSSED SURFACE COVERINGS USING BARRIER FILM

This invention relates generally to a decorative surface covering, and more particularly to a decorative surface covering having a cellular or foamed structure. Still more particularly, the invention relates to a cellular decorative surface covering having an embossed appearance in which one portion of the surface is raised or lowered compared with other portions of the surface. Still more particularly, the invention relates to the method of making such a decorative surface covering without the use of mechanical embossing.

Mechanical embossing presents the problem of achieving exact registration when the embossing is to be combined with printing. These difficulties have been magnified on foamed or cellular structures where a printed pattern must coincide with an embossed area. The difficulty increases as the width of the decorative surface covering increases. Therefore there has been a need for an improved method of imparting an embossed appearance to a cellular, thermoplastic sheet.

It is the primary object of the present invention to fill such a need. It is another object of the present invention to supply a method of imparting an embossed appearance to a thermoplastic cellular sheet structure without using mechanical embossing. It is another object of the present invention to present a product and a method for making such an embossed sheet in which the embossed area and the printed area are in excellent registration.

These objects are achieved in a straightforward and effective manner. The invention contemplates blending a vinyl resin, a plasticizer for the resin, and a blowing agent which decomposes when heated at a temperature in the range above the glass transition temperature of the plasticized vinyl resin and below the decomposition temperature of the plasticized resin. This blend, normally in the form of a plastisol when made, is formed into a sheet. There is then applied to the sheet in predetermined pattern a barrier film, the barrier film being one which will prevent penetration into said sheet of an activator (to be subsequently applied) for reducing the decomposition temperature of the blowing agent in the sheet. There is subsequently applied over the entire surface of the sheet a liquid containing said activator in order that the activator will penetrate into the sheet and lower the decomposition temperature or accelerate the rate of decomposition of the blowing agent, or both, in those areas to which the barrier compound has not been applied. The system is then heated to decompose the blowing agent in those areas in which the blowing agent is in contact with the accelerator.

Figure 2:
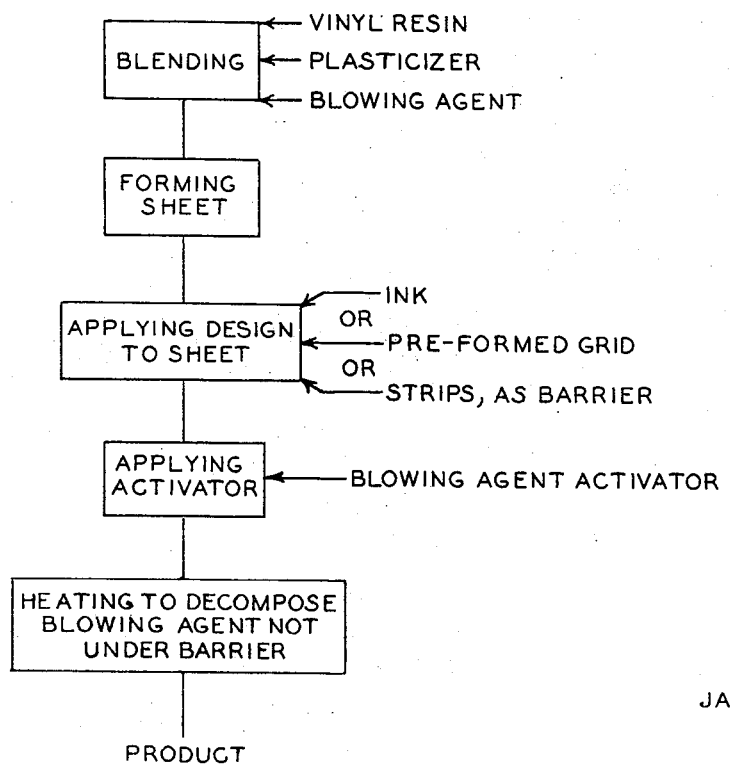

Referring to the drawings which are self-explanatory, FIG. 1 illustrates an enlarged section of the product of the present invention having a backing and a top clear coat, and FIG. 2 is a flow diagram illustrating the method of the present invention.

The thermoplastic resins useful in the present invention are those resins normally capable of forming films and sheets. Such resins will primarily comprise the polymers and copolymers of vinyl chloride. POly(vinyl chloride) itself is the preferred resin, although copolymers of vinyl chloride with vinyl acetate, vinylidene chloride, other vinyl esters such as vinyl proprionate, vinyl butyrate, as well as alkyl substituted vinyl esters may be used. Vinyl chloride may also be copolymerized with any of a number of acrylic compounds such as acrylic acids and the esters thereof and the corresponding methacrylates. Small amounts of additional additives such as maleic anhydride may be used. The thermoplastic resins are those formed by addition polymerization as opposed to the normally non-thermoplastic resins usually formed by condensation. The glass transition temperature of these thermoplastic resins is the temperature at which the resin changes from a hard, brittle solid to a flexible solid. Increasing plasticization of the resin increasingly lowers the glass transition temperature. As a practical matter, the glass transition temperature of the resin lies close to the initial gelation temperature of the resin dispersed in a plasticizer even though the initial gelation temperature is rate sensitive.

The thermoplastic resin, preferably poly(vinyl chloride) as described above will be combined with a plasticizer for the resin in order that the resin may be formed into a sheet. A convenient method for making the sheet is to utilize a dispersion grade poly(vinyl chloride) resin and blend the resin with 20–130 parts by weight plasticizer per 100 parts by weight of the resin. The formation of the plastisol is a convenient means for forming a sheet from the thermoplastic resin. A plastisol is a mixture of a thermoplastic resin and a plasticizer therefor, the resin normally being distributed in the plasticizer in a kind of slurry. Suitable plasticizers are the ester type plasticizers such as dioctyl phthalate, dioctyl sebacate, dioctyl adipate, dioctyl azelate, in which the octyl group is frequently in the form of a 2-ethyl hexyl group. Other alkyl groups can be used in place of the octyl group to yield, for example, plasticizers such as dibutyl phthalate, dibutyl sebacate, dibutyl adipate, and the like. The phosphate esters are also useful, for example tricresyl phosphate. The viscosity of the plastisol will be controlled to some extent by selection of the particular plasticizer, the particular resin, and the amounts of each to be used. Hence a range of viscosities is available depending upon how a sheet is to be formed from the plastisol.

The blowing agent must be thoroughly distributed throughout the resin-plasticizer mixture. A variety of blowing agents is available on the market for incorporation in thermoplastic resins. The preferred blowing agent for poly(vinyl chloride) is azobisformamide which normally decomposes at a temperature of about 390° F. in air. This blowing agent is particularly suitable for use in the method of the present invention in view of its relatively high decomposition temperature. The following table shows other usable blowing agents with the temperature at which they release gas vigorously in dioctyl phthalate:

| Blowing Agent | Temperature, °F. |
|---|---|
| Azobisisobutyronitrile | 240 |
| N,N'-dimethyl-N,N'-dinitrosoterephthalamide | 220 |
| p,p'-Oxybis (benzenesulfonylhydrazide) | 320 |
| p,p'-Oxybis (benzenesulfonylsemicarbazide) | 425 |
| Barium azodicarboxylate | above 480 |
| Dinitrosopentamethylenetetramine (80%) | 370 |

The usuable blowing agents will generally comprise substituted hydrazides, substituted azo compounds, and substituted nitroso compounds. The blowing agent will normally be present in an amount in the range of about 0.5%–15% by weight based on the weight of the thermoplastic resin. As a general rule, the preferred minimum decomposition temperature of the blowing agent in the resin system should be about 300° F., and the blowing agent should decompose below the decomposition temperature of the resin, which in the case of poly(vinyl chloride) would be about 400° F. However, stabilized vinyl resin compositions will normally not decompose until even higher temperatures—approaching 450° F.—are reached. The blowing agent may be admixed with the resin-plasticizer system by any convenient mixing method.

This composition containing the resin, plasticizer, and blowing agent may also contain additional ingredients such as pigments, dyes, or other decorative elements. Depending on the material used and the intensity of the color desired, the amounts of such extra additives will normally range from a small fraction of a percent to 20% by weight of the total composition. Relatively small amounts of a granular filler such as a clay, a limestone, or a silicate may be used. However, the composition will not be highly filled in view of a need for at least a portion of the composition to expand and form a cellular or foamed region. Fillers to be used, if any, will normally be present in less than about 20% by weight of the total composition.

Small amounts of heat and light stabilizers may also be incorporated. These are known in the art and may comprise the barium-cadmium salts of long-chain fatty acids, polyols such as pentaerythritol or alphamethylglucoside, nitrogen compounds such as melamine or dicyandiamide, esters such as phenyl phthalate, phenyl benzoate, o-toluol benzoate, triethylene glycol salicylates, certain of the organic phosphites, and mixtures thereof. Such stabilizers will not normally be present in amounts greater than about 3% by weight of the total composition.

The plastisol may be doctored, roll coated, knife coated, or otherwise applied to a backing. The backing may consist of any convenient substrate. If the final product is to be a floor covering, the backing will be those backings normally used in the floor covering industry. The backing may then consist of a flexible felt of cellulosic fibers which has been dipped or after-saturated in a suitable saturant such as resin or rubber solution, emulsion, or melt. Alternatively, the felt backing may be beater saturated wherein a rubber, a resin, or both is deposited on individual fibers and a sheet subsequently formed therefrom. The fibers may be cellulosic or mineral such as asbestos. It may be desirable to face-coat the felt backing in order to fill the pores in the backing and to achieve a smooth, even surface on which to deposit the plastisol described earlier. These fill coats and preliminary paint coats are well known in the art.

The plastisol may also be applied to a strippable carrier such as a steel belt, a rubber belt, or a paper or a felt having a release coat thereon. Use of a backing is not mandatory in the process or the product of the present invention.

After the plastisol has been formed as a film, either on a backing or on a carrier, heat should be applied. Application of relatively gentle heat to the plastisol causes a low degree of fusion and thus gels and slightly sets the sheet so it may be removed or otherwise handled for further treatment. The amount of heat applied at this stage of the process is insufficient to decompose the blowing agent. Gelling temperatures will generally be in the range of about 225°-350° F., with shorter times being used at higher temperatures. The actual degree of gelation of the plastisol may be controlled by varying both time and temperature. It is not desirable to form a strong, tough, tight, impervious gel by heating the plastisol at a higher temperature for a longer period of time in view of the fact that a subsequent process step depends on the penetration into the gelled plastisol of a chemical compound. Hence it is more convenient to gel the plastisol just sufficiently to withstand subsequent handling and printing steps while at the same time leaving the gel as soft as possible in order to enhance subsequent absorption of a chemical compound, to be described below.

Instead of a plastisol as described above, an organosol may be used in which an organic solvent is added to the resin-plasticizer mixture. The addition of such solvents is a further control in the viscosity of the fluid, and such solvents as the ketones, for example methyl ethyl ketone and methyl isobutyl ketone, may be used. Hydrocarbon aromatic solvents may be used, for example toluene and xylene. Aliphatics may be used such as are obtained in certain cuts from the fractionation of hydrocarbon mixtures used in the oil industry. A disadvantage, however, of using an organosol instead of a straight plastisol in the present process is that the solvent will be driven off during the incipient gelation stage and must either be recovered or otherwise removed from the sphere of operations when heat is applied to the organosol in order to gel it.

The method so far has produced a thermoplastic sheet which will normally have at this stage of the process a thickness in the range of about 0.005 to 0.15 inch, exclusive of any backing. The sheet will contain thoroughly distributed therein a blowing agent in condition to liberate gas when sufficient heat has been applied to the sheet. There is then to be applied to the gelled sheet in a predetermined pattern a film which may be identified as a barrier film. This film, when printed or otherwise applied to the surface of the gelled sheet, will prevent penetration of the blowing agent activator into the sheet beneath those areas where the film is applied. The activators (they can also be called accelerators) in the present process will penetrate into the gelled sheet and reduce the decomposition temperature of the blowing agent everywhere save in the regions beneath the barrier film. Subsequent heating of the treated sheet to the proper temperature will thus cause foaming in the regions where the activator has penetrated into the sheet, but will not bring about foaming in the regions beneath the barrier. Thus an embossed appearance results.

These activators for blowing agents are well known in the art. A variety of such compounds are commercially available. Many of the activators are metallic soaps. The principal metallic portions of the activators are zinc, lead, and cadmium. The fatty acid portion of the soap will generally range from 7-18 carbon atoms. Soaps containing 8-12 carbon atoms are preferred, and the octoate is primarily preferred. One of the most efficient activators in this class of compounds is lead octoate. Zinc octoate, however, also has high activity as an activator for reducing the decomposition temperature of these blowing agents. Mixtures of these soaps are useful. In addition to the aliphatic soaps, zinc, lead, and cadmium salts of naphthenic acid and/or phthalic acid are useful.

Although it is generally stated that these blowing agent activators or accelerators reduce the temperature of decomposition of the various blowing agents, it is recognized that such description may not be fully accurate. Instead, these blowing agent activators may affect the rate of decomposition while leaving the actual decomposition temperature unchanged. However, for the purposes of the present invention, this distinction is not very significant. The fact remains that a blowing agent yields more gas at a lower temperature when in contact with an activator than it does out of contact with that activator.

These activators are normally incorporated into the resinous composition along with the blowing agent in order to reduce the temperature at which the blowing agent decomposes and hence to save some heat costs and to reduce decomposition of the resin. In the present method, however, the activator is incorporated into the gelled plastisol sheet containing the blowing agent by spreading the activator dissolved or suspended in a suitable liquid over the surface of the gelled plastisol sheet. The activator liquid may be knife coated, doctored, printed, or otherwise applied over the entire surface of the gelled sheet. The activator thus permeates the thickness of the gel and is brought into contact with the blowing agent in this manner. To achieve penetration into the sheet, the activator will be dissolved or suspended in a liquid which will permeate the gelled plastisol. Such liquids are essentially solvents or plasticizers for the gelled resin, and a wide variety exists. All of the vinyl resin plasticizers may be used as a carrier liquid for the activator. These include all the plasticizers mentioned earlier in connection with the original formation of the plastisol from which the gelled sheet is prepared. Additionally, there may be used such solvents for vinyl resins as ketones, esters, hydrocarbons, chlorinated hydrocarbons, some of the high solvents such as dimethylformamide, and even such liquids as alcohols and ethers, if desired. The class of solvents known as the "cellosolves" are suitable. Often the carried liquid will be a mixture of a plasticizer plus another solvent such as a keytone or hydrocarbon. The activator composition may thus consist of nothing more than the activator and the solvent system for the activator, although it may also contain a detackifier component or other ingredients. The components may be thoroughly and intimately mixed in any convenient manner, and the system may be warmed to aid in solution of the activator.

When the resulting activator solution is spread over the surface of the gelled plastisol, the solvent system or carrier liquid carries the activator down into the gelled sheet and thus brings the activator into contact with the blowing agent. The blowing agent is then capable of decomposing at a lower temperature.

Since certain predetermined portions of the surface of the gelled plastisol sheet have been coated with a barrier film in order to prevent the activator from permeating the gelled sheet in regions where the barrier lies, the portions of the gelled sheet beneath the barrier film will not decompose at the same temperature as the balance of the gelled sheet in which the activator has contacted the blowing agent.

The barrier film may be a film of thermoplastic resin covering the surface and having decorative openings cut therein. In the final product, foaming of the gelled sheet will then take place only in the regions of the decorative openings in the barrier. Alternatively, the barrier film may comprise pieces of a thermoplastic film impenetrable to the accelerator system, positioned to have the desired decorative effect. For instance, pieces of film in the form of names, numbers, map outlines, trees, human or animal figures, abstract designs, or any other configuration may be placed on the surface of the gelled sheet prior to the application of the accelerator system. The barrier film in such cases may comprise a thin plasticized or unplasticized film of thermoplastic resin such as poly(vinyl chloride), vinyl chloride-vinyl acetate copolymers, or any of the other vinyl chloride copolymers, or any other such thermoplastic resinous film such as the acrylates. The barrier film may comprise metal foil, resin saturated papers, thin dry-laid sheets saturated with a suitable resinous binder, cellulosic tapes and films, and thin sheets of any of the various rubbers.

Alternatively, a polymerizable film may be printed or otherwise applied to the gelled plastisol sheet in a decorative pattern. Such a film will contain a polymerizable monomer such as ethyl acrylate or any other of the polymerizable acrylic systems along with a suitable catalyst and any necessary surfactants, thickeners, and the like to form the polymerized film in situ. Certain latexes such as oxidized polyethylene containing suitable coalescing agents will form a film on mere drying. A well-coalesced wax film may also suffice to form the barrier film. Any of the liquid barrier materials applied to the gelled plastisol may be dyed or pigmented in order to supply color to the printed matter. The final product will thus show those colors in the valleys of the embossed product, the color being in perfect register with the embossed region.

The barrier film is not limited to thermoplastic materials. Thermoset materials such as epoxy-polyamide systems, phenol-formaldehyde systems and thermoset acrylic-epoxy systems may be used. Again, such systems are readily printed onto the gelled plastisol sheet in the form of an ink. Suitable warming subsequently will aid in the crosslinking or additional polymerization in both the thermoset systems and the thermoplastic systems. The heat supplied to polymerize or coalesce will be insufficient to decompose the blowing agent in the gelled plastisol sheet.

A chemical barrier film will also suffice. A chemical barrier film will comprise a compound which reacts with the activator and destroys its effectiveness as an activator. Chelating agents such as citric acid, hexamethylene tetra acetic acid, certain sodium phosphates, and other known chelators for metallic ions may be printed or otherwise applied in a decorative pattern over the surface of the gelled plastisol sheet. Other chemical inactivating agents for the blowing agent activator are Lewis type acids such as stannous and stannic chlorides. Stannous stearate and stannous maleate may be used, as may phosphoric acid and the barium-sodium organophosphate stabilizers.

From the above, it can be seen that the barrier compound contemplated by the present invention may be either physical or chemical. The barrier compound will serve its function as a barrier if it prevents the activator from penetrating the barrier film and from reaching the blowing agent distributed throughout the gelled plastisol sheet.

Once the barrier film has been placed on the sheet and has been dried, polymerized, or otherwise fixed in position, the activator with its carrier is then coated over the entire system. Subsequent warming may aid penetration of the activator into the sheet. Aging periods of a few hours to a few days may be desirable to insure contact between the activator and the blowing agent.

The resulting sheet is then ready for the application of heat if desired. Often, however, it is desired to incorporate a clear coat over the surface of the entire system in order to serve as a wear surface in the event the final product is to be used as a floor covering or other use requiring protection of the system. The top clear coating may be any of those films widely used in the floor covering art formed, for example, from acrylic esters. A preformed sheet may be used as a wear resistant or protective layer, the sheet being a suitable vinyl resin or other film which is laid up on top of the system and heated sufficiently to form a laminate. The heat to be applied to cause lamination may also in the same step be sufficient to decompose the blowing agent in those areas where the blowing agent is in contact with the activator. In fact in most instances, coalescence, polymerization, and adherence of the top clear coat will be carried out simultaneously with decomposition of the blowing agent in those areas where it has been in contact with the activator. The heat at which such decomposition takes place will be insufficient to decompose the blowing agent in those regions beneath the barrier film where the activator cannot penetrate. Normally the temperature of decomposition of the activated blowing agent will be in the range of 300°–365° F.

The following examples illustrate several embodiments of the invention. All parts are by weight unless otherwise stated.

EXAMPLE 1

A foamable plastisol was prepared by thoroughly admixing the following ingredients:

| Ingredients | Parts |
| --- | --- |
| Poly(vinyl chloride) | 59.49 |
| Dioctyl phthalate | 28.00 |
| Epoxidized soya oil | 2.98 |
| Titanium dioxide (1:1 in dioctyl phthalate) | 5.96 |
| Azodicarbonamide (1:1 in dioctyl phthalate) | 3.57 |

This plastisol was applied to a beater saturated cellulosic felt backing by means of a Bird Blade. The plastisol on the backing was then gelled by subjecting it to a temperature of 250° F. for 4 minutes. The gelled thickness was 0.012 inch.

A barrier ink was prepared by thoroughly blending the following ingredients:

| Ingredients | Parts |
| --- | --- |
| Polymethyl methacrylate (40% in methyl ethyl ketone) | 43.0 |
| Trimethylol propane trimethacrylate | 34.0 |
| Diacetone alcohol | 19.1 |
| Citric acid | 2.4 |
| Benzoyl peroxide:dibutyl phthalate (60:40 by weight) | 0.86 |

This barrier ink was used to print a design on the gelled foamable plastisol, and the ink was oven dried for 2½ minutes at 250° F.

A liquid containing an activator (zinc 2-ethyl hexanoate) for the blowing agent was prepared by thoroughly blending the following ingredients in the amounts stated:

| Ingredients | Parts |
| --- | --- |
| Chlorinated rubber (Parlon S-5) | 19.7 |
| Zinc 2-ethyl hexanoate, 17.6% zinc (activator) | 19.3 |
| SiO₂, flatting agent, finely divided | 10.7 |
| Isopropyl acetate | 32.1 |
| Aliphatic hydrocarbon fraction (VM&P Naphtha) | 18.2 |

This activator-containing liquid was applied over the entire surface of the barrier ink-printed gelled foamable plastisol sheet. The activator ink was applied by the gravure process using an 85 line screen/35 micron depth etched plate to meter ink to applicator roll for transfer to gelled sheet. The system was allowed to age for 16 hours before proceeding to the next step.

A clear organosol top coating composition was prepared of the following composition.

| Ingredients | Parts |
| --- | --- |
| Poly(vinyl chloride) | 100 |
| Epoxidized soya oil | 5 |
| Dioctyl phthalate | 25 |
| Stabilizers (Ba, Cd, Zn phosphites) | 3 |
| Polyethylene glycol monolaurate, about 200 molecular weight | 2 |
| Hydrocarbon solvent blend | 12 |
| Solvent blend (3:1 mineral spirits:Solvesso 150) | |

This organosol was coated over the activator-treated system described above using a Bird Blade as an applicator.

The entire system was then placed in an air-circulating oven and was maintained there for 7 minutes at a temperature of 370° F. to decompose the blowing agent only in those areas in which the blowing agent was in contact with the activator. The areas beneath the barrier ink remained substantially unfoamed. The final structure had an embossed appearance wherein the depressed areas coincided exactly with the design printed by the barrier ink, the entire system having a fused, clear film over the top thereof measuring about 0.005 inch in thickness. The product was suitable for a floor covering.

EXAMPLE 2

A series of barrier inks was prepared. The following ink formed a chemical barrier which prevented penetration of the activator into the areas beneath the ink.

| Ingredients | Parts |
| --- | --- |
| Poly(vinyl chloride) and vinyl chloride-vinyl acetate copolymer plus blue pigment | 14 |
| Methyl ethyl ketone | 21 |
| Stannous chloride (barrier compound) | 22.5 |
| Tin maleate (barrier compound) | 22.5 |
| Cyclohexanone | 20.0 |

When this ink was used as the barrier ink in Example 1, excellent embossing resulted in the final product. The following barrier ink illustrates a curable epoxy resin barrier ink.

| Ingredients | Parts |
| --- | --- |
| Epoxy resin (ERL-2795) (barrier resin) | 32.5 |
| Titanium dioxide | 46.5 |
| Aromatic hydrocarbon solvent (Solvesso 150) | 7.0 |
| Grind on 3 roll mill, add | |
| Polyamide resin (Versamid 125) | 14.0 |
| Amine adduct (Genamid 250; 65:35) | 5.0 |
| Butyl acetate | 10.0 |
| Isopropyl alcohol | |

The above ink was cured by subjecting it to a temperature of 250° F. for 2½ minutes before the activator-containing coating was applied thereover. An embossed product resulted. Another epoxy-containing barrier ink was prepared on the following formula:

| Ingredients | Parts |
| --- | --- |
| Epoxy resin (Epon 815) (barrier resin) | 10 |
| Titanium dioxide | 12 |

| Ingredients | Parts |
|---|---|
| Aromatic hydrocarbon solvent (Solvesso 150) | 2 |
| Grind on 3 roll mill, add | |
| Epoxy resin (Epon 815) | 30 |
| Polyamide resin (Versamid 140) | 20 |
| Hydrocarbon solvent (VM&P Naphtha | 10 |
| Diacetone alcohol | 26 |

The final product had an embossed appearance, the valleys coinciding exactly with the barrier ink printed on the surface.

A vinyl thermosetting acrylic barrier ink was prepared on the following formulation:

| Ingredients | Parts |
|---|---|
| Polymethyl methacrylate containing hydroxyl groups, 50% solids (barrier resin) | 16.2 |
| Titanium dioxide | 16.2 |
| Grind on 3 roll mill, add | |
| Polymethyl methacrylate containing hydroxyl groups, (50% solids) | 23.6 |
| Vinyl chloride-vinyl acetate copolymer, 13% vinyl acetate | 10.0 |
| Methyl ethyl ketone | 16.8 |
| Dioxane | 16.8 |

EXAMPLE 3

Several different activator-containing liquids were prepared. Following are the formulas:

| Ingredients | Parts |
|---|---|
| Isobutyl methacrylate solution polymer | 18 |
| (1) Zinc 2-ethyl hexanoate activator | 18 |
| SiO$_2$, flatting agent, finely divided | 2–13 |
| Isopropyl acetate | 39 |
| VM&P Naphtha | 23 |

(1) Alternate activators
(a) Actafoam R-3 — Zn 10.6% — 2-ethyl hexanoic acid K 1.36% — alcohol and phthalate ester
(b) Ba, Cd, K, and Zn octoate soaps in hydrocarbon solvent
(c) Nuostabe V-1086 — Pb, Zn octoates, Zn 3.3%, Pb 14.3%
(d) Nuostabe V-1026 — Pb octoate, 45% Pb
(e) 8% Zn Naphthenate The final product had the usual embossed appearance.

To illustrate the wide range of barrier inks possible for use in the present invention, the following epoxy/thermosetting acrylic formulation was prepared:

| Ingredients | Parts |
|---|---|
| Polymethyl methacrylate having pendant carboxyl groups (50% solids) | 14.68 |
| TiO$_2$ | 22.02 |
| Grind on 3 roll mill, add | |
| Polymethyl methacrylate containing pendant carboxyl groups (50% solids) | 17.60 |
| Epoxy resin (Dow 661) | 21.50 |
| Dioxane | 20.10 |
| Cellosolve acetate | 4.00 |

This ink was printed and dried by holding the system 2½ minutes at a temperature of 250° F. The final foamed product was embossed in the areas where the barrier ink had lain.

A simple barrier was prepared by cutting out a shaped design from an aluminum foil, laying the design on the surface of the gelled foamable plastisol, rolling the surface to press the foil firmly against the sheet, and then proceeding as in Example 1 to coat with the activator-containing liquid. The resulting final product was deeply embossed in the regions where the shaped aluminum foil barrier exists.

In another specimen, the foil was peeled off the activator-treated sheet prior to applying the clear organosol top coating composition as in Example 1. Good embossing resulted in the product.

In still another specimen, strips of pressure-sensitive cellulose tape were placed on the gelled foamable plastisol prior to application of the activator solution. The final foamed sheet was embossed in the regions where the pressure-sensitive tape had been placed.

I claim:

1. A method of embossing a thermoplastic sheet which comprises
   A. blending in the absence of a blowing agent activator
      1. a vinyl resin,
      2. a plasticizer for said resin, and
      3. a blowing agent which decomposes when heated at a temperature in the range above the glass transition temperature of the plasticized vinyl resin and below the decomposition temperature of said resin,
   B. forming said blend into a sheet,
   C. applying to said sheet in a design covering certain predetermined portions only a barrier which will prevent penetration into said sheet of an activator for reducing the decomposition temperature of said blowing agent in said sheet,
   D. subsequently applying over the entire surface of said sheet a liquid containing an activator whereby said activator penetrates into said sheet and accelerates the rate of decomposition of the blowing agent in those areas to which said barrier has not been applied, and
   E. heating said sheet to decompose the blowing agent in contact with the activator.

2. A method according to claim 1 wherein said barrier comprises a thermoplastic film.

3. The method according to claim 1 wherein said barrier comprises a thermoset film.

4. The method according to claim 1 wherein said barrier comprises a chemical compound to inactivate said activator.

5. The method according to claim 1 wherein said barrier is applied to said sheet in the form of a pre-formed grid.

6. A method according to claim 1 wherein said activator comprises a zinc salt.

7. A method according to claim 1 wherein said barrier is applied by gravure printing.

8. The method according to claim 1 wherein said vinyl resin is poly(vinyl chloride).

9. The method according to claim 1 wherein said vinyl resin comprises a vinyl chloride-vinyl acetate copolymer.

10. An embossed thermoplastic sheet comprising plasticized and fused vinyl resin in sheet form having (1) foamed areas containing the decomposition products of a blowing agent, (2) unfoamed areas containing undecomposed blowing agent and occurring in a predetermined design, and a barrier film impenetrable to a blowing agent activator overlying each of said unfoamed areas.

11. A process for the manufacture of an embossed wear resistant decorative sheet of resinous composition comprising: applying a first resinous composition containing a blowing agent, but essentially no activator therefor, to the entire surface of a sheet of backing material; pregelling said first resinous composition by heating at a temperature below that required to decompose the blowing agent for a time that will result in a gel strength sufficient to withstand subsequent wind-up operations; applying to portions of the surface of said first resinous composition a barrier ink; coating the entire surface of the pre-gelled resinous composition and the barrier ink with a thin layer of a second resinous composition containing an activator for said blowing agent; permitting the activator to penetrate substantially all portions of said first resinous composition except those covered by said barrier ink; applying a wear layer over the entire surface of the second resinous composition; solidifying the wear layer; and, uniformly heating the product so obtained under controlled conditions of time and temperature to fuse and foam the product, thereby producing an expanded cellular layer wherein those areas of the surface that have not had the barrier ink applied thereto are elevated above those areas that have been coated with the barrier ink, all of the foregoing resinous compositions and the ink being fluid when applied.

12. The process of claim 11, wherein said first resinous composition comprises a polymer of vinyl chloride.

13. The process of claim 11 wherein said blowing agent is azodicarbonamide.

14. The process of claim 11 wherein said activator is zinc octoate.

15. An article of resinous composition capable, by application of heat, of forming an embossed resinous layer having first portions of a thickness greater than the thickness of second portions, comprising a first resinous composition layer containing a blowing agent but essentially no activator therefor uniformly dispersed throughout the layer; a barrier ink covering portions of said first resinous layer to form a pattern, a second resinous layer containing an effective amount of an activator for said blowing agent extending over said first resinous layer and barrier ink layer; and a resinous surface wear layer extending over said second resinous layer, said resinous composition being fused to and supported by a backing material.

16. The product of claim 15, wherein said blowing agent is azodicarbonamide.

17. The product of claim 15, wherein the activator in said second resinous layer is zinc octoate.

* * * * *

UNITED STATES PATENT OFFICE
CERTIFICATE OF CORRECTION

Patent No. 3,772,138      Dated November 13, 1973

Inventor(s) Jack H. Witman

It is certified that error appears in the above-identified patent and that said Letters Patent are hereby corrected as shown below:

Column 2, in the formula between lines 55 and 60, after "Barium azodicarboxylate" insert --above 480-- in the righthand column and cancel "above 480" from directly below the words "Barium azodicarboxylate".

Column 5, lines 37 and 38, the phrase "the carried liquid" should read --the carrier liquid--.

Column 8, in the formula between lines 12 and 20, the fifth ingredient should have the word "weight" directly behind the word "molecular" on the same line.

Column 9, in the formula between lines 10 and 25, the fifth ingredient should have the words "(50% solids)" directly behind the word "groups" on the same line. Same formula, the sixth ingredient should have the word "acetate" directly behind the word "vinyl" on the same line.

Column 9, the formula between lines 27 to 38, the ingredient "(a) Actafoam R-3 - Zn 10.6% - 2-ethyl hexanoic acid K 1.36% - alcohol and phthalate ester" should read --(a) Actafoam R-3 - Zn 10.6% ) 2-ethyl hexanoic acid
                                      K    1.36% ) alcohol and phthalate
                                                               ester--.

Column 9, in the formula between lines 45 and 52, the first ingredient should have the words "groups (50% solids)" directly behind the word "carboxyl" on the same line.

Signed and sealed this 9th day of July 1974.

(SEAL)
Attest:

McCOY M. GIBSON, JR.            C. MARSHALL DANN
Attesting Officer                 Commissioner of Patents